US012468251B2

(12) United States Patent
Tsujimoto et al.

(10) Patent No.: US 12,468,251 B2
(45) Date of Patent: Nov. 11, 2025

(54) IMAGE FORMING SYSTEM FOR SUPPLYING VOLTAGE TO IMAGE FORMING APPARATUS EVEN WHEN DC-DC CONVERTER ON MAIN BOARD FAILS

(71) Applicant: BROTHER KOGYO KABUSHIKI KAISHA, Nagoya (JP)

(72) Inventors: Yoshiyuki Tsujimoto, Nagoya (JP); Nobuyuki Tanaka, Konan (JP); Toshinori Araki, Nagoya (JP); Seiya Sato, Yokkaichi (JP); Shunsuke Aiba, Toyoake (JP); Yutaro Kuge, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/619,795

(22) Filed: Mar. 28, 2024

(65) Prior Publication Data

US 2024/0329590 A1 Oct. 3, 2024

(30) Foreign Application Priority Data

Mar. 30, 2023 (JP) ................................ 2023-056311

(51) Int. Cl.
*G03G 15/00* (2006.01)

(52) U.S. Cl.
CPC ... *G03G 15/80* (2013.01); *G03G 2215/00978* (2013.01)

(58) Field of Classification Search
USPC ........................................................... 399/88
See application file for complete search history.

(56) References Cited

U.S. PATENT DOCUMENTS 6,177,739 B1 * 1/2001 Matsudaira ........ G03G 15/5004 399/81
2016/0085199 A1 * 3/2016 Aoki .................... H02M 3/156 399/88

FOREIGN PATENT DOCUMENTS

JP 2017-068038 A 4/2017
JP 2021-118666 A 8/2021

* cited by examiner

*Primary Examiner* — Quana Grainger
(74) *Attorney, Agent, or Firm* — Merchant & Gould P.C.

(57) ABSTRACT

An image forming system includes an image forming apparatus including an AC-DC converter and a main board, and a sub board having a sub connector connectable with a main connector of the main board. When the sub board is not connected with the main board, a main DC-DC converter on the main board converts a DC voltage from the AC-DC converter into a first DC voltage and output the first DC voltage to a circuit element for image formation. When the sub board is connected with the main board, the AC-DC converter outputs the DC voltage to a sub DC-DC converter on the sub board via the main connector and the sub connector, and the sub DC-DC converter converts the DC voltage from the AC-DC converter into a second DC voltage and output the second DC voltage to the circuit element via the sub connector and the main connector.

18 Claims, 7 Drawing Sheets

IMAGE FORMING SYSTEM FOR SUPPLYING VOLTAGE TO IMAGE FORMING APPARATUS EVEN WHEN DC-DC CONVERTER ON MAIN BOARD FAILS

REFERENCE TO RELATED APPLICATIONS

This application claims priority from Japanese Patent Application No. 2023-056311 filed on Mar. 30, 2023. The entire content of the priority application is incorporated herein by reference.

BACKGROUND ART

An image forming apparatus has been known that includes a low-voltage power supply board, and a main board with a DC-DC converter and a main control circuit mounted thereon. In the known image forming apparatus, the low-voltage power supply board is configured to convert an AC voltage supplied from a commercial power supply into a 24 V DC and output the 24 V DC to the main board. It is noted that "AC" is an abbreviation for "alternating-current" and that "DC" is an abbreviation for "direct-current." The DC-DC converter on the main board is configured to convert the 24 V DC from the low-voltage power supply board into a 3.3 V DC and supply the 3.3 V DC to the main control circuit.

SUMMARY

However, in the known image forming apparatus, when the DC-DC converter fails, the main board has to be replaced, which is accompanied by a high level of operational difficulty because there are many harnesses to be disconnected from the currently attached main board and connected with a new main board. In addition, there is concern that the disconnection/connection of the harnesses may cause other malfunctions as side effects, thus resulting in high hurdles for replacing the main board.

Aspects of the present disclosure are advantageous for providing one or more improved techniques that make it possible to supply voltage to an image forming apparatus without replacing a main board when a DC-DC converter on the main board fails.

According to aspects of the present disclosure, an image forming system is provided, which includes an image forming apparatus and a sub board. The image forming apparatus is configured to form an image on a sheet. The sub board is connectable with the image forming apparatus. The image forming apparatus includes an AC-DC converter configured to convert an alternating-current (AC) voltage from a power supply into a direct-current (DC) voltage. The image forming apparatus further includes a main board that includes a circuit element for image formation, a main DC-DC converter, and a main connector. The main DC-DC converter is configured to convert the DC voltage from the AC-DC converter into a first DC voltage for driving the circuit element. The sub board includes a sub DC-DC converter configured to convert the DC voltage from the AC-DC converter into a second DC voltage for driving the circuit element. The sub board further includes a sub connector configured to connect with the main board via the main connector. The main board is configured to switch to which of the main DC-DC converter and the sub DC-DC converter the DC voltage from the AC-DC converter is to be output, depending on whether the sub board is connected with the main board via the sub connector and the main connector.

The main board is further configured to, when the sub board is not connected with the main board via the sub connector and the main connector, input the DC voltage from the AC-DC converter into the main DC-DC converter, and input the first DC voltage from the main DC-DC converter into the circuit element. The main board is further configured to, when the sub board is connected with the main board via the sub connector and the main connector, output the DC voltage from the AC-DC converter to the sub DC-DC converter via the main connector and the sub connector, thereby causing the sub DC-DC converter to output the second DC voltage to the circuit element via the sub connector and the main connector.

DESCRIPTION

It is noted that various connections are set forth between elements in the following description. It is noted that these connections in general and, unless specified otherwise, may be direct or indirect and that this specification is not intended to be limiting in this respect.

Hereinafter, an illustrative embodiment according to aspects of the present disclosure will be described with reference to the accompanying drawings.

Figure 1:
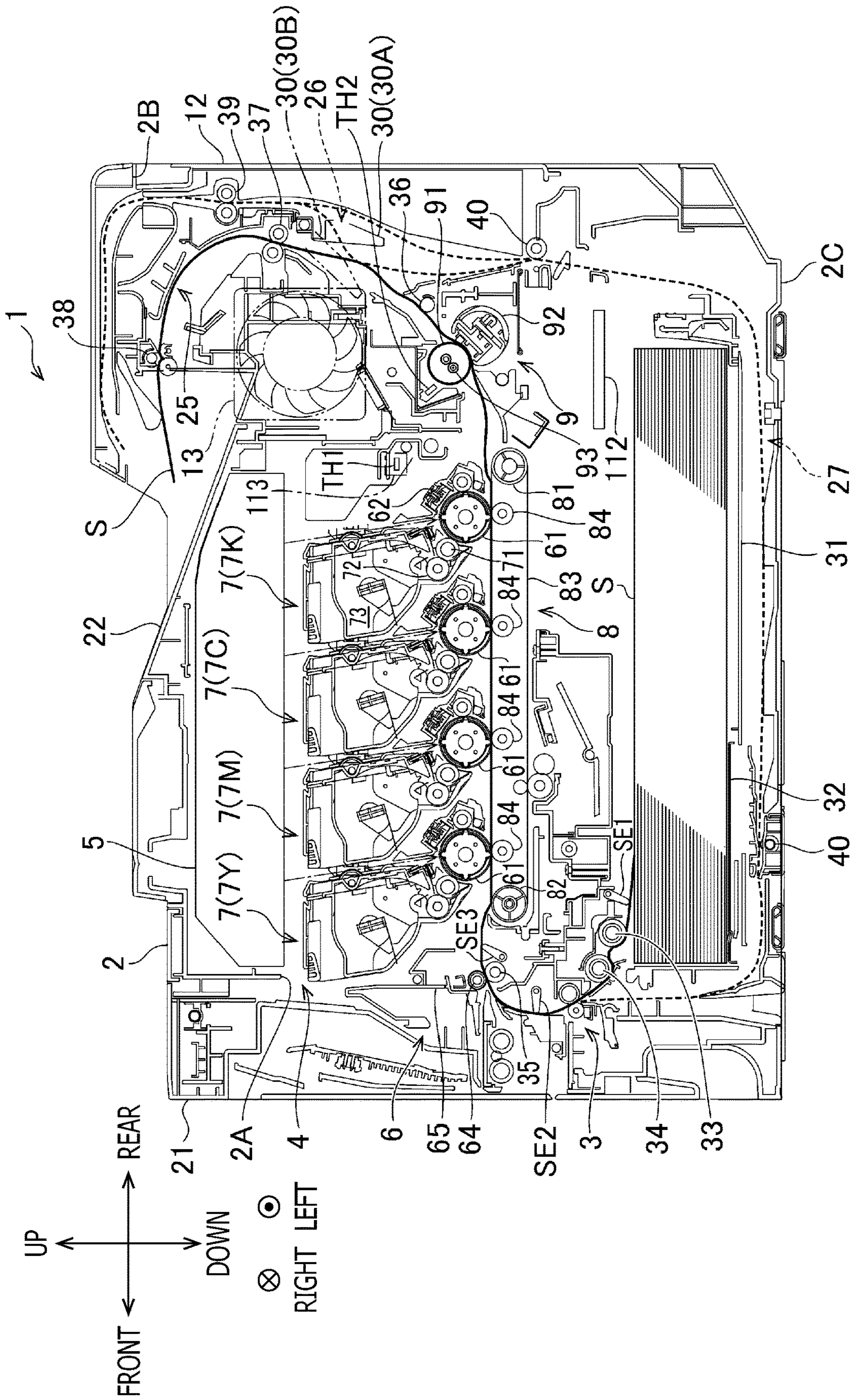
FIG. 1 is a cross-sectional side view schematically showing a color laser printer.

FIG. 1 is a cross-sectional side view schematically showing a configuration of a color laser printer 1 in an illustrative embodiment according to aspects of the present disclosure. The color laser printer 1 may be an example of an "image forming apparatus" according to aspects of the present disclosure. Hereinafter, the color laser printer 1 may be simply referred to as the printer 1. The printer 1 includes an apparatus housing 2, a conveyor 3, an image forming engine 4, and a fuser 9. In the following description, for the sake of explanatory convenience, vertical directions (i.e., an upward direction and a downward direction) and front-rear directions (i.e., a frontward direction and a rearward direction) of the printer 1 are defined as indicated by arrows in FIG. 1. In addition, a front side (i.e., a near side) and a back side (i.e., a far side) with respect to an image-drawn surface of FIG. 1 are defined as a right side and a left side of the printer 1, respectively. It is noted that hereinafter, one of the vertical directions (i.e., the upward direction and the downward direction) may be referred to as the "vertical direction" as a representative of the upward and downward directions when both of the upward and downward directions are acceptable, for the sake of explanatory simplicity. Likewise, one of the front-rear directions (i.e., the frontward direction and the rearward direction) may be referred to as the "front-rear direction." Further, one of the left-right directions (i.e., the leftward direction and the rightward direction) may be referred to as the "left-right direction."

The apparatus housing 2 has a front cover 21, a rear cover 12, a feed tray 31, a discharge tray 22, and first to third conveyance paths 25 to 27. The front cover 21 is configured to open and close a front opening 2A formed at a front portion of the apparatus housing 2. The front cover 21 is attached to a front face of the apparatus housing 2 in an openable and closeable state. The rear cover 12 is configured to open and close a rear opening 2B formed at a rear portion of the apparatus housing 2. The rear cover 12 is attached to a rear face of the apparatus housing 2 in an openable and closeable state. The feed tray 31 is removably attached to a lower portion of the apparatus housing 2. The feed tray 31 is configured to support sheets S placed thereon. The sheets S are fixed-size (e.g., A4-size) sheets. Examples of the sheets S may include, but are not limited to, paper media (e.g., plain paper and cardboard) and transparencies (e.g., OHP films). The discharge tray 22 is disposed at an upper portion of the apparatus housing 2. The discharge tray 22 is configured to receive discharged sheets S with images formed thereon.

Figure 2:
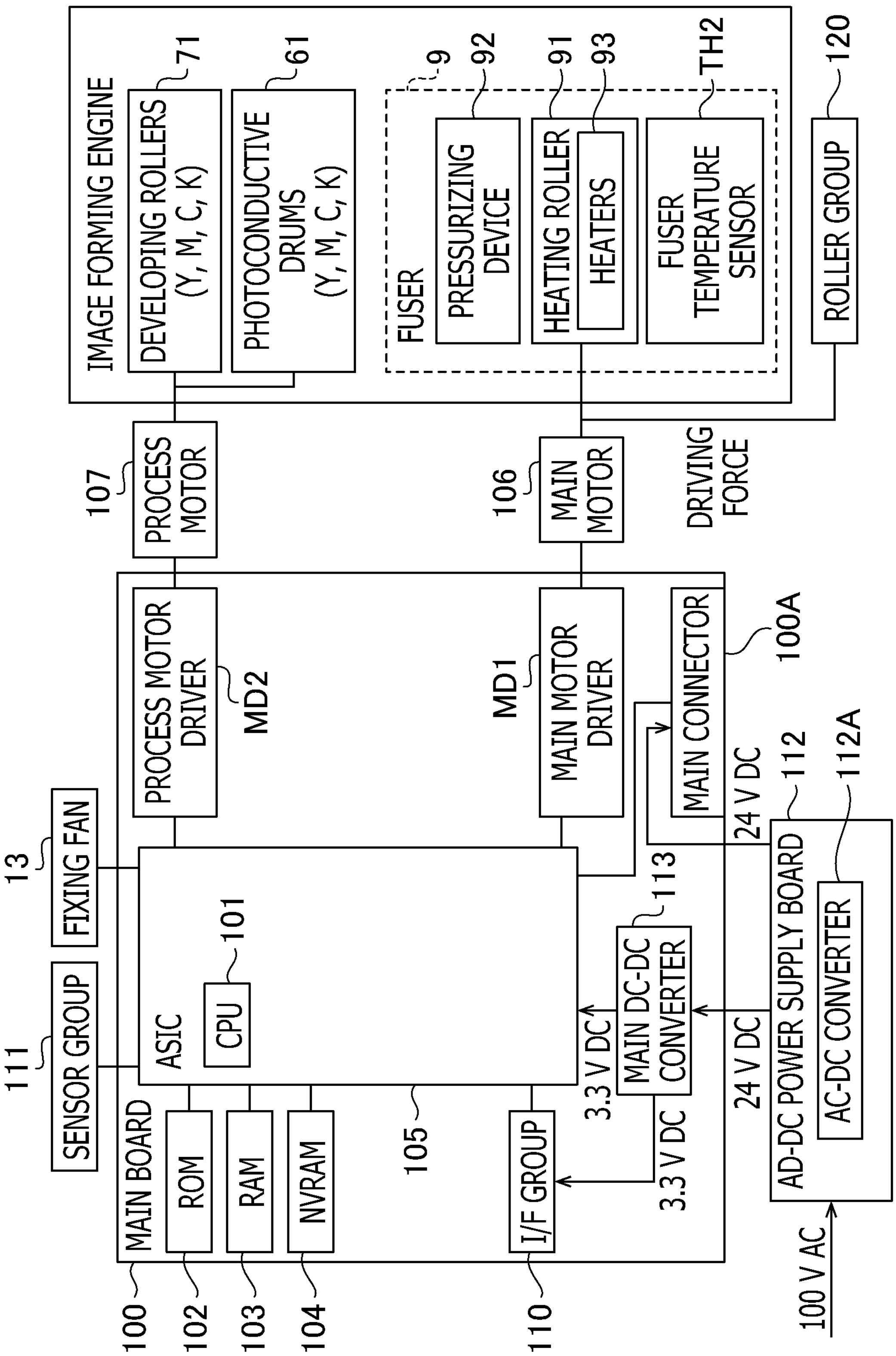
FIG. 2 is a block diagram showing a control configuration of the color laser printer.

The conveyor 3 includes a pick-up roller 33, a separation roller 34, a registration roller 35, a first conveyance roller 36, a second conveyance roller 37, a first switchback roller 38, a second switchback roller 39, a plurality of third conveyance rollers 40, a flapper 30 and a main motor 106 (see FIG. 2). A part of the second conveyance path 26 is formed by the closed rear cover 12.

The pick-up roller 33 is configured to pick up sheets S that are in the feed tray 31 and pushed upward by a sheet pressing plate 32 and to convey the picked-up sheets S toward the first conveyance path 25. The separation roller 34 is configured to separate the sheets S picked up by the pick-up roller 33 on a sheet-by-sheet basis.

The registration roller 35 is disposed upstream of the image forming engine 4 in a conveyance direction, along the first conveyance path 25. The registration roller 35 is configured to perform s skew correction for a sheet S and then convey the sheet S toward the image forming engine 4. The conveyance direction in which the registration roller 35 conveys the sheet S is a direction from front to back.

With the rear cover 12 closed when the sheet S is conveyed out of the apparatus housing 2, the conveyor 3 conveys the sheet S fed from the image forming engine 4, by the first conveyance roller 36, and guides the sheet S to the first conveyance path 25 by the flapper 30 (30A). Afterward, the conveyor 3 conveys the sheet S guided to the first conveyance path 25, by the second conveyance roller 37 and the first switchback roller 38, and discharges the sheet S onto the discharge tray 22.

With the rear cover 12 opened when the sheet S is conveyed out of the apparatus housing 2, the conveyor 3 conveys the sheet S fed from the image forming engine 4, by the first conveyance roller 36, guides the sheet S rearward by the flapper 30 (30B) that has swung to a position indicated by an imaginary line, and then discharges the sheet S through the rear opening 2B onto the open rear cover 12. The printer 1 is configured to perform image formation on the sheet S even when the rear cover 12 is open. The rear cover 12 is configured to, when opened, allow the sheet S with an image formed thereon to be discharged through the rear opening 2B.

To convey the sheet S to the image forming engine 4 again, the conveyor 3 conveys the sheet S fed from the image forming engine 4, by the first conveyance roller 36, and guides the sheet S to the first conveyance path 25 or the second conveyance path 26 by the flapper 30. When the sheet S has been guided to the first conveyance path 25, the conveyor 3 conveys the sheet S in the first conveyance path 25 to the third conveyance path 27 by the second conveyance roller 37 and the first switchback roller 38. When the sheet S has been guided to the second conveyance path 26, the conveyor 3 conveys the sheet S in the second conveyance path 26 to the third conveyance path 27 by the second switchback roller 39.

The sheet S conveyed to the third conveyance path 27 is again fed to the image forming engine 4 by the third conveyance roller 40 and the registration roller 35. Then, the sheet S, after an image has been formed thereon by the image forming engine 4, is discharged onto the discharge tray 22 by the conveyor 3.

The image forming engine 4 is configured to form an image on the sheet S by transferring a toner image onto the sheet S. The image forming engine 4 includes an exposure unit 5, a drum unit 6, four developing cartridges 7Y, 7M, 7C, and 7K, and a transfer unit 8.

The exposure unit 5 is disposed at an upper section in the apparatus housing 2. The exposure unit 5 includes a light source, a polygon mirror, lenses, and a reflector, which are not shown in any drawings. The exposure unit 5 is configured to expose surfaces of photoconductive drums 61 by emitting a light beam, indicated by an alternate long and short dash line, onto the surface of each photoconductive drum 61.

The drum unit 6 is disposed between the feed tray 31 and the exposure unit 5 in the apparatus housing 2. The drum unit 6 includes the four photoconductive drums 61, four chargers 62, a pinch roller 64, and a support frame 65 configured to support the photoconductive drums 61. The drum unit 6 is configured to be attached to and removed from the apparatus housing 2 through the front opening 2A in a state where the front cover 11 is open. The pinch roller 64 is disposed to face the registration roller 35. The pinch roller 64 is configured to rotate in accordance with the rotation of the registration roller 35 and convey the sheet S together with the registration roller 35.

The developing cartridges 7Y, 7M, 7C, and 7K correspond to the four colors yellow (Y), magenta (M), cyan (C), and black (K), respectively. The developing cartridges 7Y, 7M, 7C, and 7K are removably attached to the drum unit 6 and arranged in this order from the front to the rear of the printer 1. Each of the developing cartridges 7Y, 7M, 7C, and 7K includes a developing roller 71, a supply roller 72, and a toner container 73. The developing cartridges 7Y, 7M, 7C, and 7K have different toner colors but have substantially the same configuration other than the toner colors. Therefore, one of the developing cartridges 7Y, 7M, 7C, and 7K may hereinafter be referred to as the "developing cartridge 7" as a representative of the developing cartridges 7Y, 7M, 7C, and 7K.

The transfer unit 8 is disposed between the feed tray 31 and the drum unit 6 in the apparatus housing 2. The transfer unit 8 includes a driving roller 81, a driven roller 82, a conveyor belt 83, and four transfer rollers 84. The conveyor belt 83 is wound around the driving roller 81 and the driven roller 82. An upward-facing surface of the conveyor belt 83 is in contact with the photoconductive drums 61. The four transfer rollers 84 are disposed within a portion surrounded by the conveyor belt 83 in such a manner as to sandwich the conveyor belt 83 between each transfer roller 84 itself and a corresponding photoconductive drum 61.

The fuser 9 is disposed rearward of the image forming engine 4 in the apparatus housing 2. Specifically, the fuser 9 is located between the rear cover 12 in the closed state and the image forming engine 4. The fuser 9 has a heating roller 91 and a pressurizing device 92. The heating roller 91 is configured to heat the sheet S. The pressurizing device 92 is configured to sandwich the sheet S between the pressurizing device 92 itself and the heating roller 91. In the illustrative embodiment, the heating roller 91 includes therein one or more heaters 93 configured to heat the heating roller 91. The pressurizing device 92 includes an endless belt, a pressure pad, a holder, and a belt guide, which are shown with no reference numerals assigned. The pressure pad is configured to sandwich the endless belt between the pressure pad itself and the heating roller 91. The holder is configured to support the pressure pad.

The image forming engine 4 is configured to uniformly charge the surface of each photoconductive drum 61 by a corresponding charger 62 and expose the surface of each photoconductive drum 61 by the exposure unit 5, thereby forming an electrostatic latent image on the surface of each photoconductive drum 61. The image forming engine 4 supplies toner stored in each toner container 73 to a corresponding supply roller 72, thereby supplying the toner from the supply roller 72 to a corresponding developing roller 71. The toner supplied to the developing roller 71 is carried on the developing roller 71 as the developing roller 71 rotates.

The image forming engine 4 supplies the electrostatic latent image formed on each photoconductive drum 61 with the toner carried on the corresponding developing roller 71, thereby forming a toner image on the surface of each photoconductive drum 61. Then, the image forming engine 4 transfers the toner image on each photoconductive drum 61 onto the sheet S as the conveyor 3 conveys the sheet S fed from the feed tray 31 between each photoconductive drum 61 and the conveyor belt 83. Thereafter, the sheet S with the toner images transferred thereon is conveyed from the image forming engine 4 to the fuser 9 by the image forming engine 4 and the conveyor 3.

The fuser 9 forms an image on the sheet S by fixing the transferred toner images onto the sheet S while conveying the sheet S between the heating roller 91 and the pressurizing device 92.

The printer 1 further includes a fixing fan 13 and a fuser temperature sensor TH2 in the apparatus housing 2.

The fixing fan 13 is configured to, when driven, discharge air in the apparatus housing 2 out of the apparatus housing 2.

The fuser temperature sensor TH2 is configured to output a signal according to a temperature of the fuser 9 (more specifically, a temperature of the heating roller 91). The fuser temperature sensor TH2 is disposed at the fuser 9 and opposed to the heating roller 91 in a non-contact state. Practicable examples of the fuser temperature sensor TH2 may include, but are not limited to, a non-contact thermistor.

Next, a control configuration of the printer 1 will be described with reference to FIG. 2. As shown in FIG. 2, the printer 1 further includes an ASIC 105, a ROM 102, a RAM 103, an NVRAM 104, an I/F group 110, and a sensor group 111. It is noted that "I/F" is an abbreviation for "interface." The ASIC 105, the ROM 102, the RAM 103, the NVRAM 104, the I/F group 110, a main DC-DC converter 113, a main motor driver MD1, and a process motor driver MD2 are mounted on the main board 100.

The ASIC 105 includes a CPU 101 mounted thereon. The CPU 101 is configured to perform general control over individual elements included in the printer 1. The ASIC 105 is electrically connected with the ROM 102, the RAM 103, the NVRAM 104, the I/F group 110, the sensor group 111, the main DC-DC converter 113, the main motor driver MID1, the process motor driver MD2, and the fixing fan 13.

The ROM 102 stores various control programs and settings for controlling the printer 1.

The RAM 103 is usable as a work area from which various control programs are read out and as a storage area for temporarily storing image data included in jobs. The CPU 101 is configured to control each of the elements included in the printer 1 according to the control programs read out from the ROM 102 and signals output from various sensors, while storing the processing results in the RAM 103 or NVRAM 104.

The I/F group 110 includes, for instance, a USB I/F (not shown), a wired LAN I/F (not shown), and a wireless LAN I/F (not shown).

The sensor group 111 includes, for instance, a supply sensor SE1 (see FIG. 1), a pre-registration sensor SE2 (see FIG. 1), and a post-registration sensor SE3 (see FIG. 1).

The supply sensor SE1 is disposed upstream of the pick-up roller 33 in the conveyance direction, along the first conveyance path 25. The supply sensor SE1 is configured to detect a sheet S passing therethrough. Practicable examples of the supply sensor SE1 may include, but are not limited to, a sensor having an actuator swingable when coming into contact with the sheet S, and an optical sensor. Specifically, the supply sensor SE1 is configured to output an ON signal when the sheet S is passing through the supply sensor SE1 and output an OFF signal when there is no sheet S passing therethrough. The detection signal output from the supply sensor SE1 is transmitted to the CPU 101.

The pre-registration sensor SE2 is disposed upstream of the registration roller 35 in the conveyance direction, along the first conveyance path 25. The pre-registration sensor SE2 is configured to detect a sheet S passes therethrough. The pre-registration sensor SE2 has substantially the same configuration as the supply sensor SE1. The detection signal output from the pre-registration sensor SE2 is transmitted to the CPU 101.

The post-registration sensor SE3 is disposed upstream of the fuser 9 in the conveyance direction, along the first conveyance path 25, specifically, located between the registration roller 35 and (the most-upstream one of) the transfer rollers 84 in the conveyance direction. The post-registration sensor SE3 is configured to detect a sheet S passing therethrough. The post-registration sensor SE3 has substantially the same configuration as the supply sensor SE1. The detection signal output from the post-registration sensor SE3 is transmitted to the CPU 101.

The main motor 106 is connected with the main motor driver MD1. The ASIC 105 is configured to control the drive of the main motor 106 by outputting control signals to the main motor driver MD1. The main motor 106 is configured to drive the heating roller 91 and the roller group 120 of the fuser 9. The roller group 120 includes the pick-up roller 33, the separation roller 34, the registration roller 35, the first conveyance roller 36, the second conveyance roller 37, the first switchback roller 38, the second switchback roller 39, and the plurality of third conveyance rollers 40.

A process motor 107 is connected with the process motor driver MD2. The ASIC 105 is further configured to control the drive of the process motor 107 by outputting control signals to the process motor driver MD2. The process motor 107 is configured to drive the four developing rollers 71 and the four photoconductive drums 61.

The main DC-DC converter 113 is connected with an AC-DC power supply board 112. The AC-DC power supply board 112 has an AC-DC converter 112A. The AC-DC power supply board 112 is configured to receive an input of, e.g., 100 V AC supplied from a commercial power supply, convert the 100 V AC into, for instance, a 24 V DC through the AC-DC converter 112A, and output the 24 V DC to the main DC-DC converter 113. The main DC-DC converter 113 is configured to convert the 24 V DC output from the AC-DC power supply board 112 into, for instance, a 3.3 V DC (which may correspond to a "first DC voltage" according to aspects of the present disclosure), and output the 3.3 V DC to the ASIC 105, the I/F group 110, the sensor group 111, the ROM 102, the RAM 103, and the NVRAM 104. The ASIC 105, the I/F group 110, the sensor group 111, the ROM 102, the RAM 103, and the NVRAM 104 may correspond to a "circuit element for image formation" according to aspects of the present disclosure.

Figure 3A:
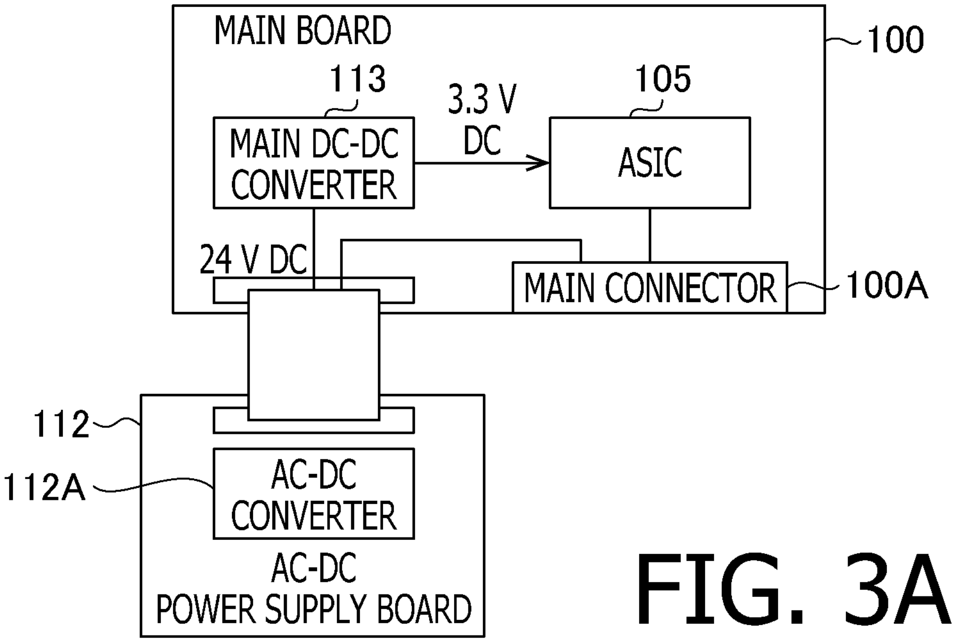
FIG. 3A shows a path for supplying a drive voltage to an ASIC when a main DC-DC converter is normally operating.

Thus, the 3.3 V DC, which is the drive voltage for the circuit elements such as the ASIC 105, is normally generated by the main DC-DC converter 113 mounted on the main board 100, and is output to the circuit elements such as the ASIC 105, as shown in FIG. 3A. However, when the main DC-DC converter 113 fails, the main DC-DC converter 113 is unable to output the 3.3 V DC. Therefore, in this case, the circuit elements such as the ASIC 105 stop operating. To deal with this, in the illustrative embodiment, a sub board 200 with a sub DC-DC converter 213 mounted thereon is connected with the main board 100, and is configured to output a 3.3 V DC (which may correspond to a "second DC voltage" according to aspects of the present disclosure) generated by the sub DC-DC converter 213 to the circuit elements such as the ASIC 105. Thus, a printing system in the illustrative embodiment includes the printer 1 and the sub board 200 connectable with the main board 100 of the printer 1.

Figure 3B:
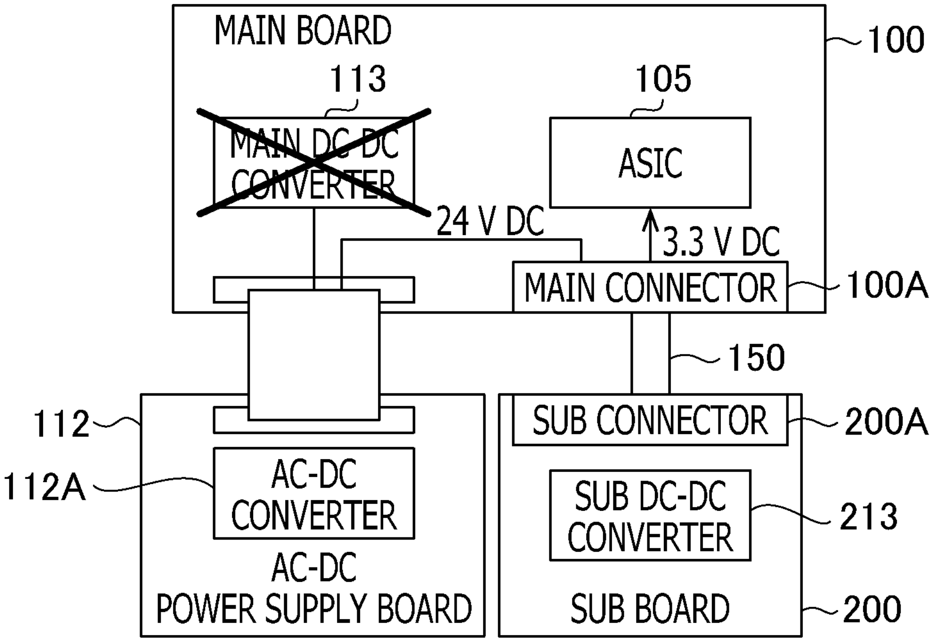
FIG. 3B shows a path for supplying the drive voltage to the ASIC when the main DC-DC converter is abnormally operating.

FIG. 3B shows the main board 100 connected with the sub board 200. In the example shown in FIG. 3B, the main DC-DC converter 113 is out of order. As shown in FIG. 3B, the main board 100 and the sub-board 200 are connected with each other by connecting a main connector 100A on the main board 100 side and a sub connector 200A on the sub board 200 side via a harness 150. The main connector 100A and the sub-connector 200A may be connected directly without the harness 150.

The 24 V DC generated by the AC-DC converter 112A is input into the sub DC-DC converter 213 via the main connector 100A, (the harness 150), and the sub connector 200A. Then, the sub DC-DC converter 213 converts the 24 V DC to the 3.3 V DC. Thereafter, the 3.3 V DC generated by the sub DC-DC converter 213 is input into the circuit elements such as the ASIC 105 via the sub connector 200A, (the harness 150), and the main connector 100A.

Figure 4:
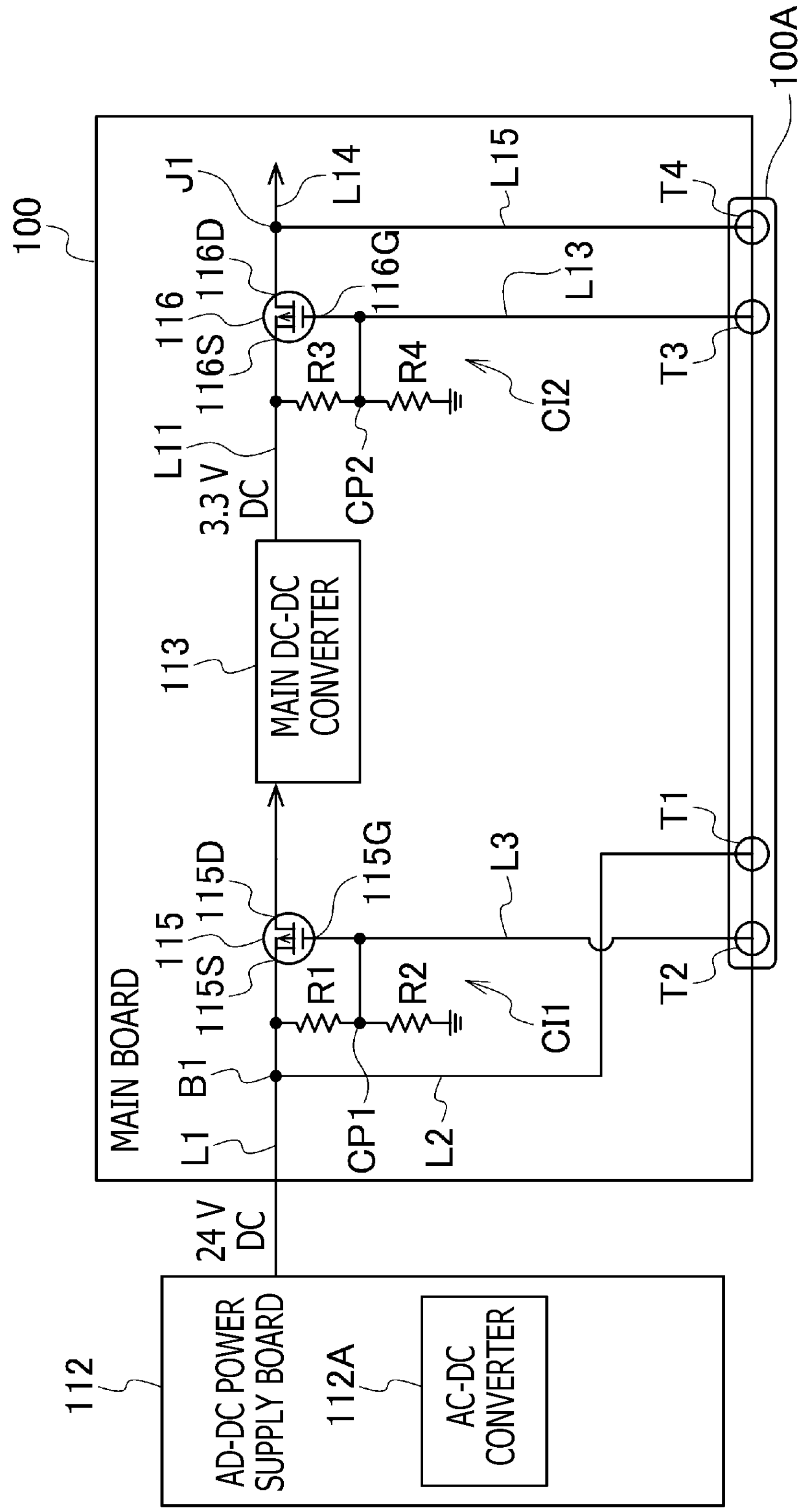
FIG. 4 shows an example of a circuit configuration around the main DC-DC converter when a sub board is not connected with a main board.

FIG. 4 shows an example of a circuit configuration around the main DC-DC converter 113 when the sub board 200 is not connected with the main board 100.

As shown in FIG. 4, the 24 V DC output from the AC-DC power supply board 112 is supplied to a power input path L1 on the main board 100. A first source terminal 115S of a first FET 115 (which may correspond to a "first switching element" according to aspects of the present disclosure) is connected with the power input path L1. A power relay path L2 (which may correspond to an "input path" according to aspects of the present disclosure) is formed between a branch point B1 on the way to the first FET 115 on the power input path L1, and a first terminal T1 of the main connector 100A. In addition, a first gate line L3 is formed between a second terminal T2 of the main connector 100A and a first gate terminal 115G of the first FET 115. Furthermore, resistors R1 and R2 are connected in series between the power input path L1 and the ground. A connection point CP1 between the resistors R1 and R2 is connected with the first gate line L3. Hereinafter, a circuit that includes the resistors R1 and R2, the wiring connecting the connection point CP1 and the first gate line L3, and the first gate line L3 may be referred to as a "first gate voltage application circuit CI1 (which may correspond to a "first wiring circuit" according to aspects of the present disclosure). The first gate voltage application circuit CI1 is configured to, when the main board 100 is not connected with the sub board 200, apply a voltage of the 24 V DC divided by the resistors R1 and R2 to the first gate terminal 115G of the first FET 115. A first drain terminal 115D of the first FET 115 is connected with an input side of the main DC-DC converter 113.

A drive voltage output path L11 for supplying the 3.3 V DC generated by and output from the main DC-DC converter 113 is formed between an output side of the main DC-DC converter 113 and a second source terminal 116S of a second FET 116 (which may correspond to a "second switching element" according aspects of the present disclosure). A second gate line L13 is formed between a second gate terminal 116G of the second FET 116 and a third terminal T3 of the main connector 100A. Further, resistors R3 and R4 are connected in series between the drive voltage output path L11 and the ground. A connection point CP2 between the resistors R3 and R4 is connected with the second gate line L13. Hereinafter, a circuit that includes the resistors R3 and R4, the wiring connecting the connection point CP2 and the second gate line L13, and the second gate line L13 may be referred to as a "second gate voltage application circuit CI2" (which may correspond to a "second wiring circuit" according aspects of the present disclosure). The second gate voltage application circuit CI2 is configured to, when the sub board 200 is not connected with the main board 100, apply a voltage of the 3.3 V DC (as generated by the main DC-DC converter 113) divided by the resistors R3 and R4 to the second gate terminal 116G of the second FET 116. A drive voltage supply path L14 is formed between a second drain terminal 116D of the second FET 116 and the circuit elements such as the ASIC 105. Furthermore, a drive voltage relay path L15 (which may correspond to an "output path" according to aspects of the present disclosure) is formed to relay the 3.3 V DC generated by and output from the sub board 200, between a junction J1 (which may correspond to a "junction" according to aspects of the present disclosure) on the way to the circuit elements such as the ASIC 105 on the drive voltage supply path L14, and a fourth terminal T4 of the main connector 100A.

For instance, when the main DC-DC converter 113 is normally operating, and the main board 100 is not connected with the sub board 200, the voltage applied to the first source terminal 115S of the first FET 115 is higher than the voltage applied to the first gate terminal 115G by the first gate voltage application circuit CI1. Therefore, the first FET 115 is turned on and outputs the 24 V DC applied to the first source terminal 115S to the main DC-DC converter 113 in a subsequent stage. Thereby, the main DC-DC converter 113 generates and outputs the 3.3 V DC to the second source terminal 116S of the second FET 116 through the drive voltage output path L11. The second gate voltage application circuit CI2 turns on the second FET 116 in substantially the same manner as the first gate voltage application circuit CI1. Thus, the second FET 116 outputs the 3.3 V DC applied to the second source terminal 116S to the circuit elements such as the ASIC 105 in a subsequent stage through the drive voltage supply path L14.

Figure 5:
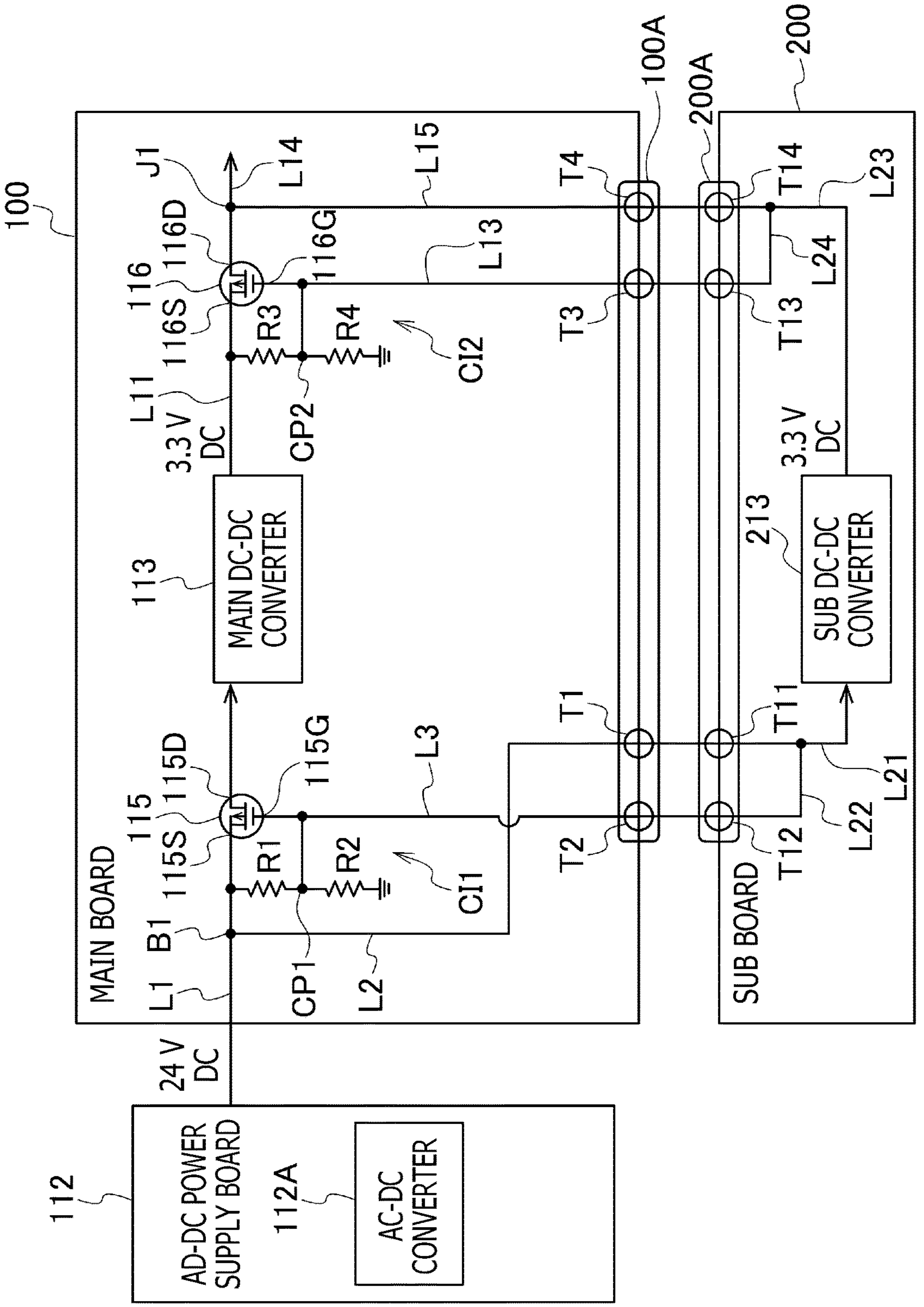
FIG. 5 shows an example of a circuit configuration around the main DC-DC converter and a sub DC-DC converter when the sub board is connected with the main board.

FIG. 5 shows an example of a circuit configuration around the main DC-DC converter 113 and the sub DC-DC converter 213 when the sub board 200 is connected with the main board 100. Since the circuit configuration around the main DC-DC converter 113 in FIG. 5 is substantially the same as that in FIG. 4, a detailed explanation thereof may be omitted as appropriate.

As shown in FIG. 5, a power input path L21 is formed between the terminal T11 of the sub connector 200A of the sub board 200 and an input side of the sub DC-DC converter 213. A power branch path L22 is formed between the power input path L21 and the terminal T12 of the sub connector 200A. A drive voltage output path L23 is formed between an output side of the sub DC-DC converter 213 and the terminal T14 of the sub connector 200A. A drive voltage branch path L24 is formed between the drive voltage output path L23 and the terminal T13 of the sub connector 200A.

When the sub board 200 is connected with the main board 100, the main connector 100A and the sub connector 200A are connected with each other. In the example shown in FIG. 3B, the main connector 100A and the sub connector 200A are connected with each other via the harness 150. However, as mentioned above, the harness 150 is not an essential element. Therefore, in FIG. 5, the main connector 100A and the sub connector 200A are connected directly with each other.

When the main connector 100A and the sub-connector 200A are connected with each other, the first to fourth terminals T1 to T4 of the main connector 100A are connected with the terminals T11 to T14 of the sub connector 200A, respectively. When the first terminal T1 of the main connector 100A is connected with the terminal T11 of the sub connector 200A, the 24 V DC output from the AC-DC power supply board 112 is applied to the input side of the sub DC-DC converter 213 through the power relay path L2 on the main board 100, the first terminal T1 of the main connector 100A, the terminal T11 of the sub connector 200A, and the power input path L21 on the sub connector 200A. At the same time, the 24 V DC applied to the input side of the sub DC-DC converter 213 is applied to the first gate terminal 115G of the first FET 115 through the power branch path L22 on the sub board 200, the terminal T12 of the sub connector 200A, the second terminal T2 of the main connector 100A, and the first gate line L3 on the main board 100. Accordingly, the voltage applied to the first gate terminal 115G of the first FET 115 is equal to or higher than the voltage applied to the first source terminal 115S of the first FET 115. Hence, the first FET 115 is turned off, and does not output the 24 V DC applied to the first source terminal 115S to the main DC-DC converter 113 in the subsequent stage. Thus, the main DC-DC converter 113 stops generating the 3.3 V DC even when the main DC-DC converter 113 is normally operating.

On the other hand, the sub DC-DC converter 213 starts operating based on the 24 V DC input as described above, and generates and outputs the 3.3 V DC. The 3.3 V DC from the sub DC-DC converter 213 is supplied to the circuit elements such as the ASIC 105 through a specific path as follows. The specific path is formed to join the drive voltage supply path L14 at the junction J1 via the drive voltage output path L23 on the sub board 200, the terminal T14 of the sub connector 200A, the fourth terminal T4 of the main connector 100A, and the drive voltage relay path L15 on the main board 100. At the same time, the 3.3 V DC output from the sub DC-DC converter 213 is applied to the second gate terminal 116G of the second FET 116 through the drive voltage branch path L24 on the sub board 200, the terminal T13 of the sub connector 200A, the third terminal T3 of the main connector 100A, and the gate line L13 on the main board 100. Accordingly, the voltage applied to the second gate terminal 116G of the second FET 116 is equal to or higher than the voltage applied to the second source terminal 116S. Hence, the second FET 116 is turned off, and does not output the voltage applied to the second source terminal 116S to the circuit elements such as the ASIC 105 in the subsequent stage. Nonetheless, at this time, since the main DC-DC converter 113 is stopped and does not output an effective 3.3 V DC, the second FET 116 does not need to be turned off, but is turned off just in case.

When the sub board 200 is connected with the main board 100, the voltage applied to the second drain terminal 116D of the second FET 116 is higher than the voltage applied to the second source terminal 116S of the second FET 116. Therefore, due to a body diode of the second FET 116, an electric current may flow back in a direction from the second drain terminal 116D to the second source terminal 116S. In view of this, it is preferable to use a FET with a reverse current prevention function as the second FET 116. Likewise, it is preferable to use a FET with a reverse current prevention function as the first FET 115.

As described above, the printing system in the illustrative embodiment includes the printer 1 configured to form an image on a sheet S, and the sub board 200. The printer 1 includes the AC-DC converter 112A configured to convert an AC voltage (e.g., 100 V AC) from a commercial power supply into a DC voltage (e.g., 24 V DC). The printer 1 further includes the main board 100. The main board 100 includes the ASIC 105 for image formation, the main DC-DC converter 113 configured to convert the DC voltage into a first DC voltage (e.g., 3.3 V DC) that is a drive voltage for the ASIC 105, and the main connector 100 A.

The sub board 200 includes the sub DC-DC converter 213 configured to convert a DC voltage into a second DC voltage (e.g., 3.3 V DC) that is a drive voltage for the ASIC 105. The sub board 200 further includes the sub connector 200A configured to connect with the main board 100 via the main connector 100A. When the main board 100 and the sub board 200 are not connected with each other via the main connector 100A and the sub connector 200A, the main DC-DC converter 113 outputs the first DC voltage to the ASIC 105. When the main board 100 and the sub board 200 are connected with each other via the main connector 100A and the sub connector 200A, the AC-DC converter 112A outputs the DC voltage to the sub DC-DC converter 213 via the main connector 100A and the sub-connector 200A, and the sub DC-DC converter 213 outputs the second DC voltage to the ASIC 105 via the sub connector 200A and the main connector 100A.

Thus, according to the printer 1 in the illustrative embodiment, when the main DC-DC converter 113 on the main board 100 fails, simply connecting the sub board 200 with the main board 100 via the connectors 100A and 200A makes it possible to output the second DC voltage (i.e., the drive voltage) from the sub DC-DC converter 213 to the circuit elements such as the ASIC 105. Namely, it is possible to output the drive voltage to the circuit elements such as the ASIC 105 without replacing the main board 100.

The main board 100 further includes the first FET 115 configured to switch whether the DC voltage from the AC-DC converter 112A is to be output to the main DC-DC converter 113. Specifically, the first FET 115 outputs the DC voltage to the main DC-DC converter 113 when the main board 100 and the sub board 200 are not connected with each other via the main connector 100A and the sub connector 200A. Meanwhile, the first FET 115 does not output the DC voltage to the main DC-DC converter 113 when the main board 100 and the sub board 200 are connected with each other via the main connector 100A and the sub connector 200A.

Thereby, when the sub board 200 is not connected with the main board 100, the first FET 115 outputs the DC voltage from the AC-DC converter 112A to the main DC-DC converter 113. Meanwhile, when the sub board 200 is connected with the main board 100, the DC voltage from the AC-DC converter 112A is output to the sub DC-DC converter 213. Namely, it is convenient that it is automatically selected to which of the main DC-DC converter 113 and the sub DC-DC converter 213 the DC voltage from the AC-DC converter 112A is to be output, by an operator simply selecting whether to connect the sub board 200 with the main board 100.

The main board 100 has the power relay path L2 that diverges from the branch point B1 in the middle of the power input path L1 extending from the AC-DC converter 112A to the first FET 115 and leads to the main connector 100A. The AC-DC converter 112A is configured to output the DC voltage to the sub DC-DC converter 213 via the power relay path L2, the main connector 100A, and the sub connector 200A when the main board 100 and the sub board 200 are connected with each other via the main connector 100A and the sub connector 200A.

Thereby, when the sub board 200 is connected with the main board 100, the first FET 115 does not output the DC voltage from the AC-DC converter 112A to the main DC-DC converter 113. In this case, the DC voltage from the AC-DC converter 112A is output to the sub DC-DC converter 213. In response, the sub DC-DC converter 213 converts the DC voltage to a second DC voltage and outputs the second DC voltage to the circuit elements such as the ASIC 105. Thus, the operator only needs to connect the sub board 200 with the main board 100 to supply the drive voltage to the circuit elements such as the ASIC 105.

The first FET 115 is a field effect transistor having the first gate terminal 115G, the first source terminal 115S, and the first drain terminal 115D. The first source terminal 115S is configured to receive an input of DC voltage. The first drain terminal 115D is connected with the main DC-DC converter 113. The main board 100 further includes the first gate voltage application circuit CI1 having the first gate line L3 to connect the first gate terminal 115G with the main connector 100A. The first gate voltage application circuit CI1 is configured to, when the main board 100 and the sub board 200 are not connected with each other via the main connector 100A and the sub connector 200A, input such a voltage based on the DC voltage as to turn on the first FET 115 into the first gate terminal 115G via the first gate line L3. The first gate voltage application circuit CI1 is further configured to, when the main board 100 and the sub board 200 are connected with each other via the main connector 100A and the sub connector 200A, input such a voltage based on the DC voltage as to turn off the first FET 115 into the first gate terminal 115G via the first gate line L3. The first FET 115 is configured to be electrically conductive between the first source terminal 115S and the first drain terminal 115D when the main board 100 and the sub board 200 are not connected with each other via the main connector 100A and the sub connector 200A. The first FET 115 is further configured to be electrically blocked between the first source terminal 115S and the first drain terminal 115D when the main board 100 and the sub board 200 are connected with each other via the main connector 100A and the sub connector 200A.

Thereby, when the sub board 200 is not connected with the main board 100, the first FET 115 is electrically conductive between the first source terminal 115S and the first drain terminal 115D. In this case, the DC voltage from the AC-DC converter 112A is output to the main DC-DC converter 113. Meanwhile, when the sub board 200 is connected with the main board 100, the first FET 115 is electrically blocked between the first source terminal 115S and the first drain terminal 115D. In this case, the DC voltage from the AC-DC converter 112A is output to the sub DC-DC converter 213. Thus, it is convenient that it is automatically selected to which of the main DC-DC converter 113 and the sub DC-DC converter 213 the DC voltage from the AC-DC converter 112A is to be output, by the operator simply selecting whether to connect the sub board 200 with the main board 100.

The first FET 115 has the reverse current prevention function to prevent an electric current from flowing reversely from the output side to the input side of the first FET 115.

Thereby, when the voltage applied to the first drain terminal 115D of the first FET 115 is higher than the voltage applied to the first source terminal 115S, the body diode of the first FET 115 makes it possible to prevent the electric current from flowing reversely from the output side (i.e., the first drain terminal 115D side) to the input side (i.e., the first source terminal 115S side) of the first FET 115.

The main board 100 further includes the second FET 116 configured to switch whether the first DC voltage from the main DC-DC converter 113 is to be output to the ASIC 105. Specifically, the second FET 116 outputs the first DC voltage to the ASIC 105 when the main board 100 and the sub board 200 are not connected with each other via the main connector 100A and the sub connector 200A. Meanwhile, the second FET 116 does not output the first DC voltage to the ASIC 105 when the main board 100 and the sub board 200 are connected with each other via the main connector 100A and the sub connector 200A.

Thus, it is convenient that it is automatically selected whether the first DC voltage from the main DC-DC converter 113 is to be output to the circuit elements such as the ASIC 105, by the operator simply selecting whether to connect the sub board 200 to the main board 100.

Further, the main board 100 has the drive voltage relay path L15 extending from the main connector 100A, at the junction J1 in the middle of the drive voltage supply path L14 extending from the second FET 116 to the ASIC 105. The sub DC-DC converter 213 is configured to output the second DC voltage to the ASIC 105 via the sub connector 200A, the main connector 100A, and the drive voltage relay path L15 when the main board 100 and the sub board 200 are connected with each other via the main connector 100A and the sub connector 200A.

Thereby, when the sub board 200 is connected with the main board 100, the second DC voltage from the sub DC-DC converter 213 is applied to the junction J1 on the drive voltage supply path L14 via the sub connector 200A, the main connector 100A, and the drive voltage relay path L15, to be output to the circuit elements such as the ASIC

105. Thus, it is possible to drive the circuit elements such as the ASIC 105 with an appropriate drive voltage.

The second FET 116 is a field effect transistor having the second gate terminal 116G, the second source terminal 116S, and the second drain terminal 116D. The second source terminal 116S is connected with the output side of the main DC-DC converter 113. The second drain terminal 116D is connected with the ASIC 105. The main board 100 further includes the second gate voltage application circuit CI2 having the second gate line L13 to connect the second gate terminal 116G with the main connector 100A. The second gate voltage application circuit CI2 is configured to, when the main board 100 and the sub board 200 are not connected with each other via the main connector 100A and the sub connector 200A, input such a voltage based on the first DC voltage as to turn on the second FET 116 into the second gate terminal 116G via the second gate line L13. The second gate voltage application circuit CI2 is further configured to, when the main board 100 and the sub board 200 are connected with each other via the main connector 100A and the sub connector 200A, input such a voltage based on the first DC voltage as to turn off the second FET 116 into the second gate terminal 116G via the second gate line L13. The second FET 116 is configured to be electrically conductive between the second source terminal 116S and the second drain terminal 116D when the main board 100 and the sub board 200 are not connected with each other via the main connector 100A and the sub connector 200A. The second FET 116 is further configured to be electrically blocked between the second source terminal 116S and the second drain terminal 116D when the main board 100 and the sub board 200 are connected with each other via the main connector 100A and the sub connector 200A.

Thereby, when the sub board 200 is not connected with the main board 100, the second FET 116 is electrically conductive between the second source terminal 116S and the second drain terminal 116D. In this case, the first DC voltage from the main DC-DC converter 113 is output to the circuit elements such as the ASIC 105. Meanwhile, when the sub board 200 is connected with the main board 100, the second FET 116 is electrically blocked between the second source terminal 116S and the second drain terminal 116D. In this case, the second DC voltage from the sub DC-DC converter 213 is output to the circuit elements such as the ASIC 105. Thus, it is convenient that it is automatically selected which of the first DC voltage from the main DC-DC converter 113 and the second DC voltage from the sub DC-DC converter 213 is to be output to the circuit elements such as the ASIC 105, by the operator simply selecting whether to connect the sub board 200 with the main board 100.

The second FET 116 has the reverse current prevention function to prevent an electric current from flowing reversely from the output side to the input side of the second FET 116.

Thereby, when the voltage applied to the second drain terminal 116D of the second FET 116 is higher than the voltage applied to the second source terminal 116S, the body diode of the second FET 116 makes it possible to prevent the electric current from flowing reversely from the output side (i.e., the second drain terminal 116D side) to the input side (i.e., the second source terminal 116S side) of the second FET 116.

The main board 100 further includes the first FET 115 and the second FET 116. The first FET 115 is configured to switch whether the DC voltage from the AC-DC converter 112A is to be output to the main DC-DC converter 113. The second FET 116 is configured to switch whether the first DC voltage from the main DC-DC converter 113 is to be output to the ASIC 105. Specifically, the first FET 115 outputs the DC voltage to the main DC-DC converter 113 when the main board 100 and the sub board 200 are not connected with each other via the main connector 100A and the sub connector 200A. Meanwhile, the first FET 115 does not output the DC voltage to the main DC-DC converter 113 when the main board 100 and the sub board 200 are connected with each other via the main connector 100A and the sub connector 200A. The second FET 115 outputs the first DC voltage to the ASIC 105 when the main board 100 and the sub board 200 are not connected with each other via the main connector 100A and the sub connector 200A. Meanwhile, the second FET 115 does not output the first DC voltage to the ASIC 105 when the main board 100 and the sub board 200 are connected with each other via the main connector 100A and the sub connector 200A.

Thus, it is convenient that it is automatically selected which of the main DC-DC converter 113 and the sub DC-DC converter 213 is used as a DC-DC converter to output the drive voltage to the circuit elements such as the ASIC 105, by the operator simply selecting whether to connect the sub board 200 with the main board 100.

Further, the main board 100 has the power supply relay path L2 and the drive voltage relay path L15. The power supply relay path L2 diverges from the branch point B1 in the middle of the power input path L1 extending from the AC-DC converter 112A to the first FET 115 and leads to the main connector 100A. The drive voltage relay path L15 extends from the main connector 100A to the junction J1 in the middle of the drive voltage supply path L14 extending from the second FET 116 to the ASIC 105. The AC-DC converter 112A is configured to output the DC voltage to the sub DC-DC converter 213 via the power relay path L2, the main connector 100A, and the sub connector 200A when the main board 100 and the sub board 200 are connected with each other via the main connector 100A and the sub connector 200A. The sub DC-DC converter 213 is configured to output the second DC voltage to the ASIC 105 via the sub connector 200A, the main connector 100A, and the drive voltage relay path L15 when the main board 100 and the sub board 200 are connected with each other via the main connector 100A and the sub connector 200A.

Thereby, when the sub board 200 is connected with the main board 100, the DC voltage from the AC-DC converter 112A is output to the sub DC-DC converter 213 via the power relay path L2, the main connector 100A, and the sub connector 200A. Then, the second DC voltage into which the DC voltage has been converted by the sub DC-DC converter 213 is output to the circuit elements such as the ASIC 105 via the sub connector 200A, the main connector 100A, and the drive voltage relay path L15. Thus, even when the sub board 200 is connected with the main board 100, it is possible to drive the circuit elements such as the ASIC 105 with an appropriate drive voltage.

The first FET 115 is a first field effect transistor having a first gate terminal, a first source terminal, and a first drain terminal. The first FET 115 has the first source terminal 115S configured to receive an input of the DC voltage, and the first drain terminal 115D connected with the input side of the main DC-DC converter 113. The second FET 116 is a second field effect transistor having a second gate terminal, a second source terminal, and a second drain terminal. The second FET 116 has the second source terminal 116S connected with the output side of the main DC-DC converter 113, and the second drain terminal 116D connected with the ASIC 105. The main board 100 further includes the first gate voltage application circuit CI1 and the second gate voltage application circuit CI2. The first gate voltage application circuit CI1 has the first gate line L3 connecting the first gate terminal 115G and the main connector 100A with each other. The first gate voltage application circuit CI1 is configured to, when the main board 100 and the sub board 200 are not connected with each other via the main connector 100A and the sub connector 200A, input such a voltage based on the DC voltage as to turn on the first FET 115 into the first gate terminal 115G via the first gate line L3. The first gate voltage application circuit CI1 is further configured to, when the main board 100 and the sub board 200 are connected with each other via the main connector 100A and the sub connector 200A, input such a voltage based on the DC voltage as to turn off the first FET 115 into the first gate terminal 115G via the first gate line L3. The second gate voltage application circuit CI2 has the second gate line L13 connecting the second gate terminal 116G and the main connector 100A with each other. The second gate voltage application circuit CI2 is configured to, when the main board 100 and the sub board 200 are not connected with each other via the main connector 100A and the sub connector 200A, input such a voltage based on the first DC voltage as to turn on the second FET 116 into the second gate terminal 116G via the second gate line L13. The second gate voltage application circuit CI2 is further configured to, when the main board 100 and the sub board 200 are connected with each other via the main connector 100A and the sub connector 200A, input such a voltage based on the first DC voltage as to turn off the second FET 116 into the second gate terminal 116G via the second gate line L13. The first FET 115 is configured to be electrically conductive between the first source terminal 115S and the first drain terminal 115D when the main board 100 and the sub board 200 are not connected with each other via the main connector 100A and the sub connector 200A. The first FET 115 is further configured to be electrically blocked between the first source terminal 115S and the first drain terminal 115D when the main board 100 and the sub board 200 are connected with each other via the main connector 100A and the sub connector 200A. The second FET 116 is configured to be electrically conductive between the second source terminal 116S and the second drain terminal 116D when the main board 100 and the sub board 200 are not connected with each other via the main connector 100A and the sub connector 200A. The second FET 116 is further configured to be electrically blocked between the second source terminal 116S and the second drain terminal 116D when the main board 100 and the sub board 200 are connected with each other via the main connector 100A and the sub connector 200A.

Thus, it is convenient that it is automatically selected into which of the main DC-DC converter 113 and the sub DC-DC converter 213 the DC voltage from the AC-DC converter 112A is to be output and which of the first DC voltage from the main DC-DC converter 113 and the second DC voltage from the sub DC-DC converter 213 is to be output to the circuit elements such as the ASIC 105, by the operator simply selecting whether to connect the sub board 200 with the main board 100.

The printer 1 further includes the AC-DC power supply board 112 having the AC-DC converter 112A. In the printer 1, the DC voltage is input into the main board 100 through a connection line connecting the AC-DC power supply board 112 and the main board 100 with each other.

Thus, the main board 100 is enabled to receive an input of DC voltage from outside the main board 100.

The ASIC 105 for image formation is a controller configured to control operations of the printer 1.

The ASIC 105 is enabled to receive an input of drive voltage from the main DC-DC converter 113 when the main DC-DC converter 113 is normally operating and to receive an input drive voltage from the sub DC-DC converter 213 when the main DC-DC converter 113 is abnormally operating.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the present disclosure are provided below.

Modifications

Figure 6:
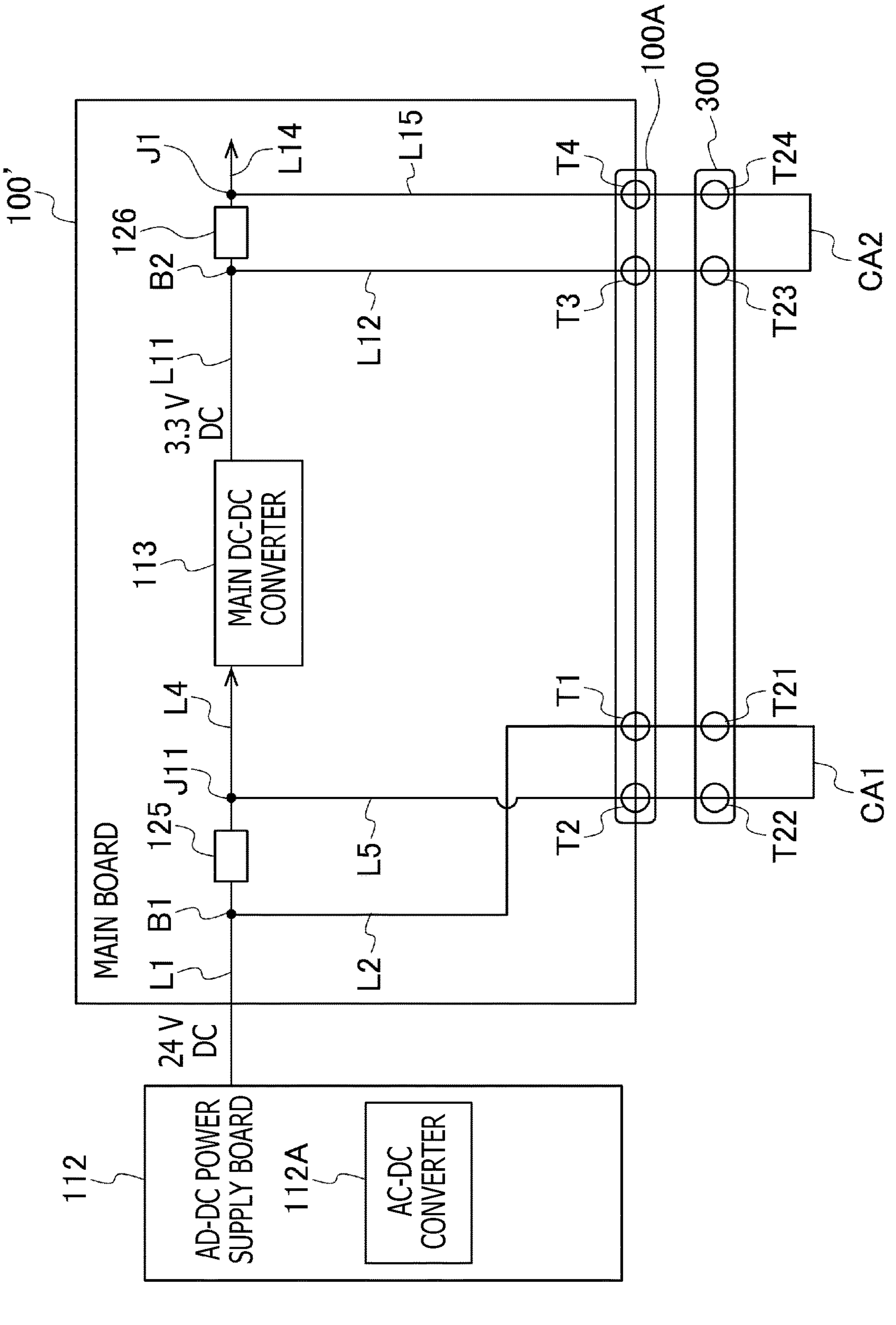
FIG. 6 shows another example of a circuit configuration around the main DC-DC converter when a sub board is not connected with a main board.
Figure 7:
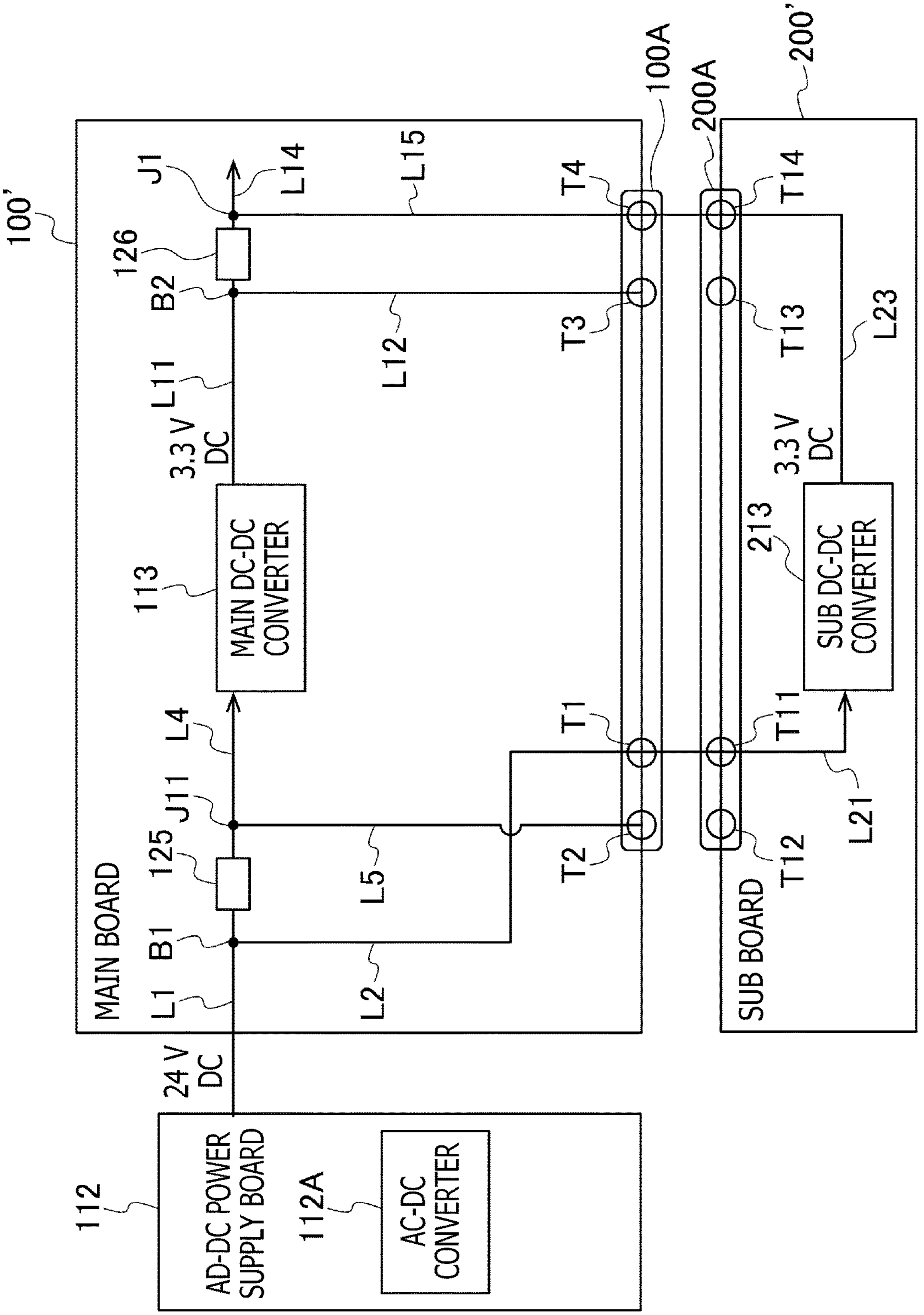
FIG. 7 shows an example of a circuit configuration around the main DC-DC converter and the sub DC-DC converter when the sub board is connected with the main board shown in FIG. 6.

FIGS. 6 and 7 show circuit configurations, different from the circuit configurations shown in FIGS. 4 and 5, in a modification according to aspects of the present disclosure. FIG. 6 shows a case in which the main DC-DC converter 113 generates a 3.3 V DC as in FIG. 4. FIG. 7 shows a case in which the sub DC-DC converter 213 generates a 3.3 V DC as in FIG. 5. The circuits in FIGS. 6 and 7 are configured by partially modifying the circuits in FIGS. 4 and 5, respectively. Therefore, in FIGS. 6 and 7, substantially the same configurations as in FIGS. 4 and 5 are provided with the same reference characters as in FIGS. 4 and 5, and detailed explanations thereof may be omitted as appropriate.

In FIG. 6, on a main board 100', a first blocking element 125 and a second blocking element 126 are used instead of the first FET 115 and the second FET 116 on the main board 100 in FIG. 4. Each of the first and second blocking elements 125 and 126 is configured to always not output a voltage applied to the input side thereof to the output side. Practicable examples of the first and second blocking elements 125 and 126 may include, but are not limited to, a high resistor and an off-state switching element. Practicable examples of the off-state switching element may include, but are not limited to, the first and second FETs 115 and 116 in the off state, and an off-state relay.

FIG. 6 shows a circuit configuration of the main board 100' not connected with the sub board 200' (see FIG. 7). As shown in FIG. 6, the output side of the first blocking element 125 and the input side of the main DC-DC converter 113 are connected with each other through the power supply path L4. The junction J11 on the power supply path L4 and the second terminal T2 of the main connector 100A are connected with each other through a bypass path L5 (which may correspond to a "first output path" according to aspects of the present disclosure).

The drive voltage output path L11 is formed between the output side of the main DC-DC converter 113 and the input side of the second blocking element 126. A second bypass path L12 (which may correspond to a "second input path" according to aspects of the present disclosure) is formed between a branch point B2 on the drive voltage output path L11 and the third terminal T3 of the main connector 100A.

When the sub board 200' is not connected with the main board 100', a connector 300 is connected with the main connector 100A. The connector 300 has terminals T21 to T24. The terminals T21 to T24 are connected with the terminals T1 to T4 of the main connector 100A, respectively. The terminals T21 and T22 are connected with each other through a first cable CA1. The terminals T23 and T24 are connected with each other through a second cable CA2.

When the connector 300 is connected with the main connector 100A, the 24V DC from the AC-DC power board 112 is applied to the junction J11 on the power supply path L4 via the power relay path L2 (which may correspond to a "first input path" according to aspects of the present disclosure) on the main board 100', the first terminal T1 of the main connector 100A, the terminal T21 of the connector 300, the first cable CA1, the terminal T22 of the connector 300, the second terminal T2 of the main connector 100A, and the bypass path L5 on the main board 100'. Thus, the 24V DC from the AC-DC power board 112 is applied to the main DC-DC converter 113. Thereby, the main DC-DC converter 113 generates the 3.3 V DC and outputs the generated 3.3 V DC to the input side of the blocking element 126 via the drive voltage output path L11.

Then, the 3.3 V DC from the main DC-DC converter 113 is applied to the junction J1 on the drive voltage supply path L14 via the second bypass path L12 on the main board 100', the third terminal T3 of the main connector 100A, the terminal T23 of the connector 300, the second cable CA2, the terminal T24 of the connector 300, and the drive voltage relay path L15 (which may correspond to a "second output path" according to aspects of the present disclosure) on the main board 100'. Thus, the 3.3 V DC from the main DC-DC converter 113 is supplied to the circuit elements such as the ASIC 105.

FIG. 7 shows a circuit configuration of the main board 100' with the sub board 200' connected therewith. As shown in FIG. 7, in substantially the same manner as the connection between the main board 100 and the sub board 200, the connection between the main board 100' and the sub board 200' is made by connecting the main connector 100A and the sub connector 200A with each other. However, in the connection between the main board 100' and the sub board 200', unlike the connection between the main board 100 and the sub board 200, no connection lines are connected with the terminals T12 and T13 of the sub connector 200A on the sub board 200'. Therefore, the main connector 100A is open both between the first terminal T1 and the second terminal T2 and between the third terminal T3 and the fourth terminal T4.

When the sub board 200' is connected with the main board 100', the 24 V DC from the AC-DC converter 112A is applied to the input side of the sub DC-DC converter 213 via the branch point B1 on the power input path L1 on the main board 100', the power relay path L2, the first terminal T1 of the main connector 100A, the terminal T11 of the sub connector 200A, and the power input path L21 on the sub board 200'. The sub DC-DC converter 213 converts the input 24 V DC into a 3.3 V DC. The 3.3 V DC from the sub DC-DC converter 213 is applied to the junction J1 on the drive voltage supply path L14 via the drive voltage output path L23 on the sub board 200', the terminal T14 of the sub connector 200A, the fourth terminal T4 of the main connector 100A, and the drive voltage relay path L15 on the main board 100'. Thus, the 3.3 V DC from the sub DC-DC converter 213 is supplied to the circuit elements such as the ASIC 105.

As described above, the printer 1 in the modification is configured to form an image on a sheet S, and includes the AC-DC converter 112A configured to convert an AC voltage (e.g., 100 V AC) from a commercial power supply into a DC voltage (e.g., 24 V DC). The printer 1 in the modification further includes the main board 100'. The main board 100' includes the ASIC 105 for image formation, the main DC-DC converter 113, and the main connector 100A. The main DC-DC converter 113 is configured to convert the DC voltage into a first DC voltage (e.g., 3.3 V DC) that is a drive voltage for the ASIC 105. The main connector 100A is disposed at the main board 100' side and configured to connect with the sub board 200'.

The sub board 200' includes the sub DC-DC converter 213 and the sub connector 200A. The sub DC-DC converter 213 is configured to convert the DC voltage into a second DC voltage (e.g., 3.3 V DC) that is a drive voltage for the ASIC 105. The sub connector 200A is disposed at the sub board 200' side and configured to connect with the main board 100'. When the main board 100' and the sub board 200' are not connected with each other via the main connector 100A and the sub connector 200A, the main DC-DC converter 113 outputs the first DC voltage to the ASIC 105. Meanwhile, when the main board 100' and the sub board 200' are connected with each other via the main connector 100A and the sub connector 200A, the AC-DC converter 112A outputs the DC voltage to the sub DC-DC converter via the main connector 100A and the sub connector 200A. In this case, the sub DC-DC converter 213 outputs the second DC voltage to the ASIC 105 via the sub connector 200A and the main connector 100A.

Thus, even with the printer 1 in the modification, when the main DC-DC converter 113 on the main board 100' fails, simply connecting the sub-board 200' to the main board 100' via the connectors 100A and 200A makes it possible to output the drive voltage from the sub DC-DC converter 213 to the circuit elements such as the ASIC 105. Thus, it is possible to output the drive voltage to the circuit elements such as the ASIC 105 without replacing the main board 100'.

The main board 100' further includes the power relay path L2 and the bypass path L5. The power relay path L2 extends from the AC-DC converter 112A to the main connector 100A. The detour path L5 extends from the main connector 100A to the main DC-DC converter 113. The main connector 100A includes the first terminal T1 connected with the power relay path L2, and the second terminal T2 connected with the bypass path L5. When the main board 100' and the sub board 200' are not connected with each other via the main connector 100A and the sub connector 200A, the first cable CA1 configured to connect the first terminal T1 and the second terminal T2 with each other is attached to the main connector 100A. In this case, the AC-DC converter 112A outputs the DC voltage to the main DC-DC converter 113 via the power relay path L2, the first terminal T1, the first cable CA1, the second terminal T2, and the bypass path L5. Meanwhile, when the main board 100' and the sub board 200' are connected with each other via the main connector 100A and the sub connector 200A, the first cable CA1 is not attached to the main connector 100A. Therefore, in this case, the main connector 100A is open between the first terminal T1 and the second terminal T2.

Thus, when the sub board 200' is not connected with the main board 100', the DC voltage from the AC-DC converter 112A is output to the main DC-DC converter 113. Meanwhile, when the sub board 200' is connected with the main board 100', the DC voltage from the AC-DC converter 112A is output to the sub DC-DC converter 213. Namely, it is convenient that it is automatically selected to which of the main DC-DC converter 113 and the sub DC-DC converter 213 the DC voltage from the AC-DC converter 112A is to be output, by the operator simply selecting whether to connect the sub board 200' with the main board 100'.

The main board 100' further includes the second bypass path L12 and the drive voltage relay path L15. The second bypass path L12 extends from the main DC-DC converter 113 to the main connector 100A. The drive voltage relay path L15 extends from the main connector 100A to the ASIC 105. The main connector 100A includes the third terminal T3 connected with the second bypass path L12, and the fourth terminal T4 connected with the drive voltage relay path L15. When the main board 100' and the sub board 200' are not connected with each other via the main connector 100A and the sub connector 200A, the second cable CA2 connecting the third terminal T3 and the fourth terminal T4 with each other is attached to the main connector 100A. In this case, the main DC-DC converter 113 outputs the first DC voltage to the ASIC 105 via the second bypass path L12, the third terminal T3, the second cable CA2, the fourth terminal T4, and the drive voltage relay path L15. Meanwhile, when the main board 100' and the sub board 200' are connected with each other via the main connector 100A and the sub connector 200A, the second cable CA2 is not attached to the main connector 100A. Therefore, in this case, the main connector 100A is open between the third terminal T3 and the fourth terminal T4.

Thus, when the sub board 200' is not connected with the main board 100', the first DC voltage from the main DC-DC converter 113 is output to the circuit elements such as the ASIC 105 via the second bypass path L12, the third terminal T3, the second cable CA2, the fourth terminal T4, and the drive voltage relay path L15. Meanwhile, when the sub board 200' is connected with the main board 100', the DC voltage from the AC-DC converter 112A is output to the sub DC-DC converter 213 and converted into the second DC voltage by the sub DC-DC converter 213. Thereby, the second DC voltage is output from the sub DC-DC converter 213 to the circuit elements such as the ASIC 105. Accordingly, it is possible to drive the circuit elements such as the ASIC 105 with an appropriate drive voltage both when the sub board 200' is not connected with the main board 100' and when the sub board 200' is connected with the main board 100'.

The main board 100' further includes the power relay path L2, the bypass path L5, the second bypass path L12, and the drive voltage relay path L15. The power relay path L2 extends from the AC-DC converter 112A to the main connector 100A. The bypass path L5 extends from the main connector 100A to the main DC-DC converter 113. The second bypass path L12 extends from the main DC-DC converter 113 to the main connector 100A. The drive voltage relay path L15 extends from the main connector 100A to the ASIC 105. The main connector 100A has the first terminal T1, the second terminal T2, the third terminal T3, and the fourth terminal T4. The first terminal T1 is connected with the power relay path L2. The second terminal T2 is connected with the bypass path L5. The third terminal T3 is connected with the second bypass path L12. The fourth terminal T4 is connected with the drive voltage relay path L15. When the main board 100' and the sub board 200' are not connected with each other via the main connector 100A and the sub connector 200A, the first cable CA1 connecting the first terminal T1 and the second terminal T2 with each other and the second cable CA2 connecting the third terminal T3 and the fourth terminal T4 with each other are attached to the main connector 100A. In this case, the AC-DC converter 112A outputs the DC voltage to the main DC-DC converter 113 via the power relay path L2, the first terminal T1, the first cable CA1, the second terminal T2, and the bypass path L5. Further, in this case, the main DC-DC converter 113 outputs the first DC voltage to the ASIC 105 via the second bypass path L12, the third terminal T3, the second cable CA2, the fourth terminal T4, and the drive voltage relay path L15. Meanwhile, when the main board 100' and the sub board 200' are connected with each other via the main connector 100A and the sub connector 200A, none of the first and second cables CA1 and CA2 is attached to the main connector 100A. Therefore, in this case, the main connector 100A is open both between the first terminal T1 and the second terminal T2 and between the third terminal T3 and the fourth terminal T4.

Thus, when the sub board 200' is not connected with the main board 100', the DC voltage from the AC-DC converter 112A is output to the main DC-DC converter 113 via the power relay path L2, the first terminal T1, the first cable CA1, the second terminal T2, and the bypass path L5. Further, in this case, the first DC voltage from the main DC-DC converter 113 is output to the circuit elements such as the ASIC 105 via the second bypass path L12, the third terminal T3, the second cable CA2, the fourth terminal T4, and the drive voltage relay path L15. Meanwhile, when the sub board 200' is connected with the main board 100', the DC voltage from AC-DC converter 112A is output to the sub DC-DC converter 213 and converted into the second DC voltage by the sub DC-DC converter 213. Thereby, the second DC voltage is output from the sub DC-DC converter 213 to the circuit elements such as the ASIC 105. Accordingly, it is possible to drive the circuit elements such as the ASIC 105 with an appropriate drive voltage both when the sub board 200' is not connected with the main board 100' and when the sub board 200' is connected with the main board 100'.

In the aforementioned illustrative embodiment and modification, both the main DC-DC converter 113 and the sub DC-DC converter 213 are configured to convert the input 24 V DC into a 3.3 V DC. However, both the input voltage and the output voltage are just examples, and practicable examples thereof are not limited to the above examples. Further, in addition to the main DC-DC converter 113 and the sub DC-DC converter 213, one or more additional main DC-DC converters and sub DC-DC converters may be connected in parallel. In this case, the 24 V DC may be converted into a voltage (e.g., 5 V DC or 7 V DC) other than the 3.3 V DC. Further, in this case, the voltage input into each main DC-DC converter may be different from the voltages input into the other main DC-DC converters. Namely, respective different voltages may be input into the individual main DC-DC converters. Likewise, in this case, the voltage input into each sub DC-DC converter may be different from the voltages input into the other sub DC-DC converters. Namely, respective different voltages may be input into the individual sub DC-DC converters.

In the aforementioned illustrative embodiment and modification, the color laser printer 1 has been described as an example of an “image forming apparatus” according to aspects of the present disclosure. However, practicable examples of the “image forming apparatus” are not limited to this, but may include a monochrome laser printer. Further, practicable examples of the “image forming apparatus” are not limited to printers, but may include a multi-function peripheral and a copy machine.

The following shows examples of associations between elements illustrated in the aforementioned illustrative embodiment(s) and modification(s), and elements claimed according to aspects of the present disclosure. For instance, the printer 1 may be an example of an "image forming apparatus" according to aspects of the present disclosure. Each of the sub boards 200 and 200' may be an example of a "sub board" according to aspects of the present disclosure. The printing system including the printer 1 and the sub board 200 or 200' may be an example of an "image forming system" according to aspects of the present disclosure. The AC-DC converter 112A may be an example of an "AC-DC converter" according to aspects of the present disclosure. Each of the main boards 100 and 100' may be an example of a "main board" according to aspects of the present disclosure. The ASIC 105, the I/F group 110, the sensor group 111, the ROM 102, the RAM 103, and the NVRAM 104 may be included in examples of a "circuit element for image formation" according to aspects of the present disclosure. The main DC-DC converter 113 may be an example of a "main DC-DC converter" according to aspects of the present disclosure. The main connector 100A may be an example of a "main connector" according to aspects of the present disclosure. The sub DC-DC converter 213 may be an example of a "main connector" according to aspects of the present disclosure. The sub connector 200A may be an example of a "main connector" according to aspects of the present disclosure. The first FET 115 may be an example of a "first switching element" according to aspects of the present disclosure. The first FET 115 may be an example of a "first field effect transistor" according to aspects of the present disclosure. The first gate terminal 115G may be an example of a "first gate terminal" according to aspects of the present disclosure. The first source terminal 115S may be an example of a "first source terminal" according to aspects of the present disclosure. The first drain terminal 115D may be an example of a "first drain terminal" according to aspects of the present disclosure. The second FET 116 may be an example of a "second switching element" according to aspects of the present disclosure. The second FET 116 may be an example of a "second field effect transistor" according to aspects of the present disclosure. The second gate terminal 116G may be an example of a "second gate terminal" according to aspects of the present disclosure. The second source terminal 116S may be an example of a "second source terminal" according to aspects of the present disclosure. The second drain terminal 116D may be an example of a "second drain terminal" according to aspects of the present disclosure. The power relay path L2 may be an example of an "input path" according to aspects of the present disclosure. The power relay path L2 may be an example of a "first input path" according to aspects of the present disclosure. The second bypass path L12 may be an example of a "second input path" according to aspects of the present disclosure. The drive voltage relay path L15 may be an example of an "output path" according to aspects of the present disclosure. The bypass path L5 may be an example of a "first output path" according to aspects of the present disclosure. The drive voltage relay path L15 may be an example of a "second output path" according to aspects of the present disclosure. The first gate voltage application circuit CI1 may be an example of a "first wiring circuit" according to aspects of the present disclosure. The second gate voltage application circuit CI2 may be an example of a "second wiring circuit" according to aspects of the present disclosure. The first gate line L3 may be an example of a "first gate line" according to aspects of the present disclosure. The second gate line L13 may be an example of a "second gate line" according to aspects of the present disclosure. The first terminal T1 may be an example of a "first terminal" according to aspects of the present disclosure. The second terminal T2 may be an example of a "second terminal" according to aspects of the present disclosure. The third terminal T3 may be an example of a "third terminal" according to aspects of the present disclosure. The fourth terminal T4 may be an example of a "fourth terminal" according to aspects of the present disclosure. The AC-DC power supply board 112 may be an example of a "power supply board" according to aspects of the present disclosure. The power input path L1 may be an example of a "connection line" according to aspects of the present disclosure. The first cable CA1 may be an example of a "first cable" according to aspects of the present disclosure. The second cable CA2 may be an example of a "second cable" according to aspects of the present disclosure. The 3.3 V DC from the main DC-DC converter 113 may be an example of a "first DC voltage" according to aspects of the present disclosure. The 3.3 V DC from the sub DC-DC converter 213 may be an example of a "second DC voltage" according to aspects of the present disclosure. The junction J1 may be an example of a "junction" according to aspects of the present disclosure.

What is claimed is:

1. An image forming system comprising:

an image forming apparatus configured to form an image on a sheet; and a sub board connectable with the image forming apparatus, wherein the image forming apparatus comprises:

an AC-DC converter configured to convert an alternating-current (AC) voltage from a power supply into a direct-current (DC) voltage; and a main board comprising:

a circuit element for image formation;

a main DC-DC converter configured to convert the DC voltage from the AC-DC converter into a first DC voltage for driving the circuit element; and a main connector, wherein the sub board comprises:

a sub DC-DC converter configured to convert the DC voltage from the AC-DC converter into a second DC voltage for driving the circuit element; and a sub connector configured to connect with the main board via the main connector, wherein the main board is configured to:

switch to which of the main DC-DC converter and the sub DC-DC converter the DC voltage from the AC-DC converter is to be output, depending on whether the sub board is connected with the main board via the sub connector and the main connector;

when the sub board is not connected with the main board via the sub connector and the main connector, input the DC voltage from the AC-DC converter into the main DC-DC converter, and input the first DC voltage from the main DC-DC converter into the circuit element; and when the sub board is connected with the main board via the sub connector and the main connector, output the DC voltage from the AC-DC converter to the sub DC-DC converter via the main connector and the sub connector, thereby causing the sub DC-DC converter to output the second DC voltage to the circuit element via the sub connector and the main connector.

2. The image forming system according to claim 1, wherein the main board further comprises a first switching element configured to:

switch whether the DC voltage from the AC-DC converter is to be output to the main DC-DC converter, depending on whether the sub board is connected with the main board via the sub connector and the main connector;

output the DC voltage from the AC-DC converter to the main DC-DC converter when the sub board is not connected with the main board via the sub connector and the main connector; and not output the DC voltage from the AC-DC converter to the main DC-DC converter when the sub board is connected with the main board via the sub connector and the main connector.

3. The image forming system according to claim 2, wherein the main board further comprises an input path that diverges from a branch point on a path extending from the AC-DC converter to the first switching element and leads to the main connector, and wherein the main board is further configured to output the DC voltage from the AC-DC converter to the sub DC-DC converter via the input path, the main connector, and the sub connector when the sub board is connected with the main board via the sub connector and the main connector.

4. The image forming system according to claim 3, wherein the first switching element includes a first field effect transistor having:

a first gate terminal;

a first source terminal configured to receive an input of the DC voltage from the AC-DC converter; and a first drain terminal connected with an input side of the main DC-DC converter, wherein the main board further comprises a first wiring circuit that has a first gate line connecting the first gate terminal and the main connector with each other, the first wiring circuit being configured to:

input such a voltage based on the DC voltage from the AC-DC converter as to turn on the first field effect transistor into the first gate terminal via the first gate line, when the sub board is not connected with the main board via the sub connector and the main connector; and input such a voltage based on the DC voltage from the AC-DC converter as to turn off the first field effect transistor into the first gate terminal via the first gate line, when the sub board is connected with the main board via the sub connector and the main connector, and wherein the first switching element is further configured to:

be electrically conductive between the first source terminal and the first drain terminal when the sub board is not connected with the main board via the sub connector and the main connector; and be electrically blocked between the first source terminal and the first drain terminal when the sub board is connected with the main board via the sub connector and the main connector.

5. The image forming system according to claim 2, wherein the first switching element is configured to prevent an electric current from flowing reversely from an output side of the first switching element to an input side of the first switching element.

6. The image forming system according to claim 1, wherein the main board further comprises:

a first input path extending from the AC-DC converter to the main connector; and a first output path extending from the main connector to the main DC-DC converter, wherein the main connector comprises:

a first terminal connected with the first input path; and a second terminal connected with the first output path, wherein the image forming system further comprises a first cable configured to be detachably attached to the main connector and to, when attached to the main connector, connect the first terminal with the second terminal, and wherein the main board is further configured to:

when the sub board is not connected with the main board via the sub connector and the main connector, have the first cable attached to the main connector, thereby inputting the DC voltage from the AC-DC converter into the main DC-DC converter via the first input path, the first terminal, the first cable, the second terminal, and the first output path; and when the sub board is connected with the main board via the sub connector and the main connector, not have the first cable attached to the main connector, thereby setting the main connector open between the first terminal and the second terminal.

7. The image forming system according to claim 1, wherein the main board further comprises a second switching element configured to:

switch whether the first DC voltage from the main DC-DC converter is to be output to the circuit element, depending on whether the sub board is connected with the main board via the sub connector and the main connector;

output the first DC voltage from the main DC-DC converter to the circuit element when the sub board is not connected with the main board via the sub connector and the main connector; and not output the first DC voltage from the main DC-DC converter to the circuit element when the sub board is connected with the main board via the sub connector and the main connector.

8. The image forming system according to claim 7, wherein the main board further comprises an output path extending from the main connector to a junction on a path extending from the second switching element to the circuit element, and wherein the sub DC-DC converter is further configured to output the second DC voltage to the circuit element via the sub connector, the main connector, and the output path when the sub board is connected with the main board via the sub connector and the main connector.

9. The image forming system according to claim 8, wherein the second switching element includes a second field effect transistor having:

a second gate terminal;

a second source terminal connected with an output side of the main DC-DC converter; and a second drain terminal connected with the circuit element, wherein the main board further comprises a second wiring circuit that has a second gate line connecting the second gate terminal and the main connector with each other, the second wiring circuit being configured to:

input such a voltage based on the first DC voltage from the main DC-DC converter as to turn on the second field effect transistor into the second gate terminal via the second gate line, when the sub board is not connected with the main board via the sub connector and the main connector; and input such a voltage based on the first DC voltage from the main DC-DC converter as to turn off the second field effect transistor into the second gate terminal via the second gate line, when the sub board is connected with the main board via the sub connector and the main connector, and wherein the second switching element is further configured to:

be electrically conductive between the second source terminal and the second drain terminal when the sub board is not connected with the main board via the sub connector and the main connector; and be electrically blocked between the second source terminal and the second drain terminal when the sub board is connected with the main board via the sub connector and the main connector.

10. The image forming system according to claim 7, wherein the second switching element is configured to prevent an electric current from flowing reversely from an output side of the second switching element to an input side of the second switching element.

11. The image forming system according to claim 1, wherein the main board further comprises:

a second input path extending from the main DC-DC converter to the main connector; and a second output path extending from the main connector to the circuit element, wherein the main connector comprises:

a third terminal connected with the second input path; and a fourth terminal connected with the second output path, wherein the image forming system further comprises a second cable configured to be detachably attached to the main connector and to, when attached to the main connector, connect the third terminal with the fourth terminal, and wherein the main board is further configured to:

when the sub board is not connected with the main board via the sub connector and the main connector, have the second cable attached to the main connector, thereby inputting the first DC voltage from the main DC-DC converter into the circuit element via the second input path, the third terminal, the second cable, the fourth terminal, and the second output path; and when the sub board is connected with the main board via the sub connector and the main connector, not have the second cable attached to the main connector, thereby setting the main connector open between the third terminal and the fourth terminal.

12. The image forming system according to claim 1, wherein the main board further comprises:

a first switching element configured to:

switch whether the DC voltage from the AC-DC converter is to be output to the main DC-DC converter, depending on whether the sub board is connected with the main board via the sub connector and the main connector;

output the DC voltage from the AC-DC converter to the main DC-DC converter when the sub board is not connected with the main board via the sub connector and the main connector; and not output the DC voltage from the AC-DC converter to the main DC-DC converter when the sub board is connected with the main board via the sub connector and the main connector; and a second switching element configured to:

switch whether the first DC voltage from the main DC-DC converter is to be output to the circuit element, depending on whether the sub board is connected with the main board via the sub connector and the main connector;

output the first DC voltage from the main DC-DC converter to the circuit element when the sub board is not connected with the main board via the sub connector and the main connector; and not output the first DC voltage from the main DC-DC converter to the circuit element when the sub board is connected with the main board via the sub connector and the main connector.

13. The image forming system according to claim 12, wherein the main board further comprises:

an input path that diverges from a branch point on a path extending from the AC-DC converter to the first switching element and leads to the main connector; and an output path extending from the main connector to a junction on a path extending from the second switching element to the circuit element, and wherein the main board is further configured to, when the sub board is connected with the main board via the sub connector and the main connector, output the DC voltage from the AC-DC converter to the sub DC-DC converter via the input path, the main connector, and the sub connector, thereby causing the sub DC-DC converter to output the second DC voltage to the circuit element via the sub connector, the main connector, and the output path.

14. The image forming system according to claim 12, wherein the first switching element includes a first field effect transistor having:

a first gate terminal;

a first source terminal configured to receive an input of the DC voltage from the AC-DC converter; and a first drain terminal connected with an input side of the main DC-DC converter, wherein the second switching element includes a second field effect transistor having:

a second gate terminal;

a second source terminal connected with an output side of the main DC-DC converter; and a second drain terminal connected with the circuit element, wherein the main board further comprises:

a first wiring circuit that has a first gate line connecting the first gate terminal and the main connector with each other, the first wiring circuit being configured to:

input such a voltage based on the DC voltage from the AC-DC converter as to turn on the first field effect transistor into the first gate terminal via the first gate line, when the sub board is not connected with the main board via the sub connector and the main connector; and input such a voltage based on the DC voltage from the AC-DC converter as to turn off the first field effect transistor into the first gate terminal via the first gate line, when the sub board is connected with the main board via the sub connector and the main connector; and a second wiring circuit that has a second gate line connecting the second gate terminal and the main connector with each other, the second wiring circuit being configured to:

input such a voltage based on the first DC voltage from the main DC-DC converter as to turn on the second field effect transistor into the second gate terminal via the second gate line, when the sub board is not connected with the main board via the sub connector and the main connector; and input such a voltage based on the first DC voltage from the main DC-DC converter as to turn off the second field effect transistor into the second gate terminal via the second gate line, when the sub board is connected with the main board via the sub connector and the main connector, wherein the first switching element is further configured to:

be electrically conductive between the first source terminal and the first drain terminal when the sub board is not connected with the main board via the sub connector and the main connector; and be electrically blocked between the first source terminal and the first drain terminal when the sub board is connected with the main board via the sub connector and the main connector, and wherein the second switching element is further configured to:

be electrically conductive between the second source terminal and the second drain terminal when the sub board is not connected with the main board via the sub connector and the main connector; and be electrically blocked between the second source terminal and the second drain terminal when the sub board is connected with the main board via the sub connector and the main connector.

15. The image forming system according to claim 12, wherein the first switching element is configured to prevent an electric current from flowing reversely from an output side of the first switching element to an input side of the first switching element, and wherein the second switching element is configured to prevent an electric current from flowing reversely from an output side of the second switching element to an input side of the second switching element.

16. The image forming system according to claim 1, wherein the main board further comprises:

a first input path extending from the AC-DC converter to the main connector; and a first output path extending from the main connector to the main DC-DC converter;

a second input path extending from the main DC-DC converter to the main connector; and a second output path extending from the main connector to the circuit element, wherein the main connector comprises:

a first terminal connected with the first input path; and a second terminal connected with the first output path;

a third terminal connected with the second input path; and a fourth terminal connected with the second output path, wherein the image forming system further comprises:

a first cable configured to be detachably attached to the main connector and to, when attached to the main connector, connect the first terminal with the second terminal; and a second cable configured to be detachably attached to the main connector and to, when attached to the main connector, connect the third terminal with the fourth terminal, and wherein the main board is further configured to:

when the sub board is not connected with the main board via the sub connector and the main connector, have the first cable and the second cable attached to the main connector, thereby inputting the DC voltage from the AC-DC converter into the main DC-DC converter via the first input path, the first terminal, the first cable, the second terminal, and the first output path, and inputting the first DC voltage from the main DC-DC converter into the circuit element via the second input path, the third terminal, the second cable, the fourth terminal, and the second output path; and when the sub board is connected with the main board via the sub connector and the main connector, have neither the first cable nor the second cable attached to the main connector, thereby setting the main connector open both between the first terminal and the second terminal and between the third terminal and the fourth terminal.

17. The image forming system according to claim 1, further comprising:

a power supply board having the AC-DC converter; and a connection line connecting the power supply board and the main board with each other, the DC voltage from the AC-DC converter being input into the main board through the connection line.

18. The image forming system according to claim 1, wherein the circuit element for image formation is configured to control operations of the image forming apparatus.

* * * * *